(12) United States Patent
Zhang et al.

(10) Patent No.: US 7,921,274 B2
(45) Date of Patent: Apr. 5, 2011

(54) COMPUTER MEMORY ADDRESSING MODE EMPLOYING MEMORY SEGMENTING AND MASKING

(75) Inventors: Bo Zhang, San Diego, CA (US);
Guofang Jiao, San Diego, CA (US);
Yun Du, San Diego, CA (US); Jay Chunsup Yun, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 11/737,206

(22) Filed: Apr. 19, 2007

(65) Prior Publication Data

US 2008/0263315 A1    Oct. 23, 2008

(51) Int. Cl.
*G06F 12/00*    (2006.01)
*G06F 13/00*    (2006.01)

(52) U.S. Cl. ......... 711/202; 711/100; 711/154; 711/200
(58) Field of Classification Search .................. 711/2, 6, 711/100, 154, 163, 200, 202, 206–209; 712/200; 718/1, 100
See application file for complete search history.

(56) References Cited

U.S. PATENT DOCUMENTS

| | | | | |
|---|---|---|---|---|
| 3,800,292 A * | 3/1974 | Curley et al. | ................. | 711/129 |
| 4,297,743 A * | 10/1981 | Appell et al. | ................. | 718/106 |
| 4,380,066 A | 4/1983 | Spencer et al. | | |
| 4,432,051 A | 2/1984 | Bogaert et al. | | |
| 5,530,665 A | 6/1996 | Yoneda | | |
| 5,774,600 A | 6/1998 | Strongin et al. | | |
| 5,815,729 A | 9/1998 | Henry et al. | | |
| 5,946,708 A * | 8/1999 | Fang et al. | .................... | 711/113 |
| 5,951,676 A | 9/1999 | Henry et al. | | |
| 5,956,748 A * | 9/1999 | New | .............................. | 711/149 |
| 6,021,121 A | 2/2000 | Heinrich | | |
| 6,115,761 A * | 9/2000 | Daniel et al. | .................... | 710/57 |
| 6,151,618 A | 11/2000 | Wahbe et al. | | |
| 6,430,668 B2 * | 8/2002 | Belgard | ........................ | 711/202 |
| 6,807,617 B2 * | 10/2004 | McGrath | ....................... | 711/208 |
| 6,851,040 B2 * | 2/2005 | Anvin et al. | ................... | 711/220 |
| 6,880,068 B1 * | 4/2005 | McGrath | ....................... | 712/220 |
| 2001/0020264 A1 * | 9/2001 | Belgard | ........................ | 711/206 |

OTHER PUBLICATIONS

Segment Register Mechanism for Mapping Input/Output Facilities of a Processor Complex NN9305267, IBM Technical Disclosure Bulletin, May 1, 1993.*
Partial European Search Report, EP1983424, Search Division, European Patent Office, The Hague, Nov. 8, 2008.
Partial International Search Report, PCT/US2008/060793, International Searching Aurhority, European Patent Office, Nov. 7, 2008.
European Search Report, EP1983424, Search Division, European Patent Office, The Hague, Jan. 27, 2009.

* cited by examiner

*Primary Examiner* — Tuan V. Thai

(57) ABSTRACT

A computer addressing mode and memory access method rely on a memory segment identifier and a memory segment mask for indicating memory locations. In this addressing mode, a processor receives an instruction comprising the memory segment identifier and memory segment mask. The processor employs a two-level address decoding scheme to access individual memory locations. Under this decoding scheme, the processor decodes the memory segment identifier to select a particular memory segment. Each memory segment includes a predefined number of memory locations. The processor selects memory locations within the memory segment based on mask bits set in the memory segment mask. The disclosed addressing mode is advantageous because it allows non-consecutive memory locations to be efficiently accessed.

28 Claims, 5 Drawing Sheets

COMPUTER MEMORY ADDRESSING MODE EMPLOYING MEMORY SEGMENTING AND MASKING

TECHNICAL FIELD

The invention relates generally to computers, and more specifically, to memory addressing schemes used in computers.

BACKGROUND

In some computing environments, system size and power consumption are key design constraints. For example, in mobile systems such as laptops, personal digital assistants (PDAs), cellular phones and other wireless mobile devices, the physical space and power available for computing resources is relatively limited. In these systems, power is generally limited to available battery capacity and size is generally limited by consumer tastes.

Despite environmental constraints, the market demand for increased functionality has consistently challenged the limits of mobile computing technology. Users seemingly have an insatiable desire for new and enhanced features on their mobile devices. Examples of enhanced mobile features include cameras, both video and still, video players, music players, email, texting, web browsing, games and the like. All of these features can be integrated into a single mobile device with wireless phone and data services. Some of these features, particularly advanced 3-D gaming and other graphics applications, are computationally and memory intensive. To support such demanding applications on resource limited platforms, it is desirable to have a relatively small computing unit that is capable of providing the necessary performance at reduced levels of power consumption.

SUMMARY

It is an advantage of the present invention to provide a computer system that reduces power consumption and increases bus efficiency by reducing bus traffic in certain operational circumstances. In modern computers, power consumption is related to the number of information bits being transferred over internal buses. To reduce bus traffic, the computer system disclosed herein includes a novel memory addressing mode that significantly reduces the number address bits used in making certain bus transfers.

In accordance with an exemplary embodiment of the invention, a computer processor addressing mode relies on a memory segment identifier and a memory segment mask for indicating memory locations. In this addressing mode, the processor receives an instruction comprising the memory segment identifier and memory segment mask. The processor decodes the memory segment identifier to select a particular memory segment. Each memory segment includes a predefined number of memory locations. The processor selects memory locations within the memory segment based on mask bits set in the memory segment mask. The disclosed addressing mode is advantageous because it allows both consecutive and non-consecutive memory locations to be efficiently accessed.

Other aspects, features, embodiments, methods and advantages of the invention will be or will become apparent to one with skill in the art upon examination of the following figures and detailed description. It is intended that all such additional features, embodiments, processes and advantages be included within this description, be within the scope of the invention, and be protected by the accompanying claims.

BRIEF DESCRIPTION OF THE DRAWINGS

It is to be understood that the drawings are solely for purpose of illustration and do not define the limits of the invention. Furthermore, the components in the figures are not necessarily to scale, emphasis instead being placed upon illustrating the principles of the invention. In the FIGS, like reference numerals designate corresponding parts throughout the different views.

DETAILED DESCRIPTION

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Figure 1:
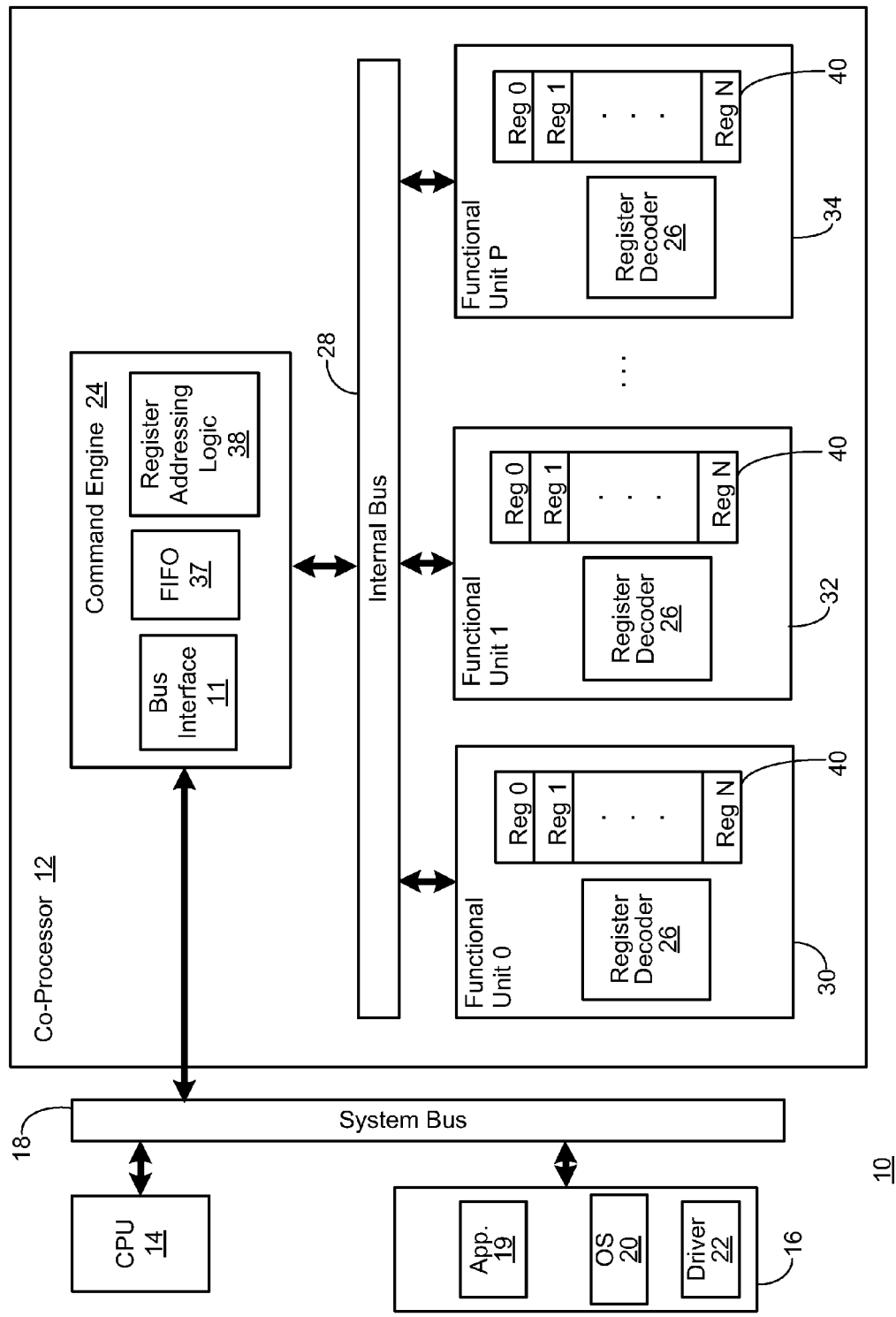
FIG. 1 is a block diagram of a computer system in accordance with an exemplary embodiment of the present invention.

Turning now to the drawings, and in particular to FIG. 1, there is illustrated a block diagram of a computer system 10 in accordance with an exemplary embodiment of the present invention. The computer system 10 is not limited to any particular operational environment or application; however, it is preferably incorporated in a wireless mobile device, such as a cellular phone, PDA, laptop computer or the like. Furthermore, the computer system 10 can be implemented using any suitable computing technology. For example, the system 10 may be built using any suitable combination of hardware and software components, and may be implemented as a system-on-a-chip, or alternatively, it may be implemented using multiple chips and components.

The system 10 includes a co-processor 12 in communication with a central processing unit (CPU) 14 by way of a system bus 18. A system memory 16 is also connected to the system bus 18 and is accessible to the CPU 14 and co-processor 12.

The co-processor 12 employs a two-level address decoding scheme that decodes a register segment identifier (ID) and a register segment mask to access individual registers. In the first-level of decoding, the register segment ID is decoded by digital circuitry to indicate a register segment. In the second-level of decoding, the register segment mask is decoded by digital circuitry to select individual registers in the register segment. The two-level address decoding scheme generally uses fewer addressing bits when compared to conventional global address schemes. In addition, the scheme simplifies the address decoding logic contained in the co-processor 12.

The co-processor 12 supplements the functions of the CPU 14 by offloading certain processor-intensive tasks from the CPU 14 to accelerate the overall system performance. Preferably, the co-processor 12 is a graphic processing unit (GPU) that accelerates the processing of 3-D graphics.

In most GPUs, including co-processor 12, there are internal configuration registers (see FIG. 1, Reg 0-Reg N) that need to be loaded with data or control values before the GPU begins its rendering operations. To accomplish this rendering configuration, a driver 22 sends a set of register data units to the co-processor 12 through the system bus 18, which is preferably 32 bits and/or 8-bit aligned. These internal configuration registers can be periodically updated by the driver 22 based the operational state of the rendering.

Conventional GPUs use global addressing to locate their internal configuration registers. Thus, if a conventional GPU has n internal registers, the register address bits will require m bits where $2^m \geq n$. With conventional global addressing, there are typically three ways for a driver to send registers to a GPU co-processor: pack mode, pair mode and consecutive mode. Using pack mode, the register address is included with register data in a single bus-wide word, so only one system bus transaction is needed to load each internal register. With pair mode, each register data unit is transferred with its destination register address, both of which are bus-width words. Thus, using this mode, two system bus transactions are needed to load a single internal register. Using consecutive mode, internal registers consecutive in address are updated sequentially by a single instruction. The instruction includes a header packet which contains a base address of the first register and a count of the total number of registers to be updated, followed by the register data units.

Because the system bus width is typically 32 bits or 8-bits aligned, the following problems may occur with the above conventional addressing modes. For pair mode, the register address itself consumes one entire system bus cycle. Thus, the overhead for loading co-processor registers using this mode is relatively large. For pack mode, the register data is limited to the remaining bits after the bits for the register address. The number data bits that are allowed in pack mode are insufficient for some applications. Also, to send a group of register data units using pack mode still requires a multi-bit register address for each bus transfer. Where a co-processor has numerous internal registers, the bus bandwidth consumed by address bits can become unsuitably large. The consecutive mode is efficient for loading internal registers consecutive in address. However, there are situations where registers to be loaded are not consecutively located (non-consecutive in address). In these situations, therefore, multiple short consecutive register batches have to be used in which the header packet overhead will outweigh the savings normally achieved by consecutive mode addressing.

The segment/mask addressing mode disclosed herein overcomes the shortcomings of the pair, pack and consecutive addressing modes described above. More particularly, the segment/mask addressing mode effectively reduces the address bits of registers, which means that the bus traffic is reduced and that the data payload becomes greater relative to the number of bits used for addressing. This significantly reduces system power consumption in certain operational scenarios, such as 3-D graphics processing. Furthermore, as bus interfaces become wider, e.g., 64 or 128 bits, the efficiencies of the segment/mask address mode increases.

The segment/mask addressing mode entails two aspects that differentiate it from conventional global addressing: register segmenting and register segment masking. The co-processors 12, 412 described herein employ two-level address decoding to access registers addressed by the segment/mask addressing mode.

Register segmenting divides registers into plural, predefined groups (segments). The segments are addressed by the register segment identifier (ID). Preferably, each segment of registers is dedicated to a corresponding functional unit in the co-processor 12 because individual functional units are usually programmed for the same rendering function. Each functional unit can include a different number of registers in its register segment. It is also contemplated that multiple register segments can be included in a single functional unit.

Register segment masking provides that each register in a register segment has a local index number (preferably starting from 0) so that it can be indexed by a register segment mask. The mask indicates the offset locally within register segment 40 the functional unit, if needed. There is one mask bit per register in the register segment mask and mask bit value of '1' means the corresponding register will be accessed, i.e., either written to or read from. The mask index can start from either the least significant bit (LSB) or the most significant bit (MSB), although starting from the LSB is preferred.

Unlike global addressing, the segment/mask address mode uses the register segment ID to differentiate among register segments. There are fewer register segments than registers, so addressing bits are conserved. Furthermore, instead of using a conventional binary address to address each individual register, the register segment mask uses one bit to index each register in a register segment. This indexing supports updating multiple registers at non-consecutive addresses, in addition to updating registers at consecutive locations.

By supporting registers in both consecutive and non-consecutive addresses, the segment/mask mode provides an efficient and easy way to program and pass data to the registers. It also simplifies design because the segment/mask mode addressing does not always require an address comparator, and it makes driver encoding easier by focusing on registers in organized into groups (segments).

Returning now to FIG. 1, the co-processor 12 utilizes the segment/mask addressing mode to efficiently access configuration registers Reg 0-Reg N in each of the functional units 30-34. The co-processor 12 includes a command engine 24, a plurality of pipelined functional units 30-34, and an internal bus 28 connecting the command engine 24 and the functional units 30-34. Graphics data being processed internally by the co-processor pipeline can be transferred between the functional units by a data pipeline (not shown).

The command engine 24 is the primary functional unit in the co-processor 12 and includes a bus interface 11 for receiving instructions and configuration register data from the driver 22 through the system bus 18. The command engine 24 decodes the instructions and passes the configuration data to the different functional units 30-34 for storage in the internal register segments 40 over the internal bus 28. The internal bus 28 is preferably 64 data bits in width. The configuration data is directed to specific registers in the segments 40 based on the register segment ID and register segment mask, using the segment/mask address mode.

The command engine 24 includes register addressing logic (RAL) 38 and a first-in-first-out (FIFO) memory 37 for processing instructions having the segment/mask address mode. Details of an exemplary segment/mask instruction format are described below in connection with FIG. 2 and details of the FIFO 37 and RAL 38 are described below in connection with FIG. 3.

Each of the functional units 30-34 performs one or more specific operations on data that it receives. Preferably, the operations are those involved in rendering 3-D graphics output. The operation of the functional units 30-34 is controlled by the command engine 24. To control the functional units 30-34, the command engine 24 issues control signals and configuration data to the functional units 30-34, respectively, over the internal bus 28. Each of the functional units 30-34 includes a register decoder 26 and a register segment 40. The register decoder 26 decodes individual register addresses that it receives over the internal bus 28. Each register segment 40 includes a predefined number of registers, Reg 0-Reg N. The registers can be any suitable size, and are preferably 64 bits.

The CPU 14 is the primary processor in the system 10 and executes instructions stored in the system memory 16. Although the CPU 14 may be any suitable processor, it is preferably a commercially-available microprocessor core, such as an ARM9 processor core from ARM, Inc, or a digital signal processor (DSP).

The system memory 16 stores data and executable instructions used by the CPU 14 and co-processor 12. The system memory 16 may be implemented using any suitable storage technology, and it is preferably a solid-state memory device, such as RAM or flash memory. The memory 16 may also use other memory technologies such as optical or magnetic memory disk drives.

A software application 19 requiring services provided by the co-processor 12 may be stored in the memory 16. The application 19 can be a software program such as a 3-D game. The memory 16 also stores an operating system (OS) software program 20 and the driver 22 for permitting the OS 20 to call the services of the co-processor 12. A commercially-available operating system such, as BREW, SYMBIAN, WINDOWS MOBILE can be used by the system 10. The application 19 can also use industry standard application programming interfaces (APIs), such as those specified by OPENGL ES 1.x or 2.x for graphics applications, or DIRECTX 9.0.

The system bus 18 is the interface through which the co-processor 12 receives instructions. It is preferably implemented using an industry-standard bus protocol, such as the Advanced Microprocessor Bus Architecture (AMBA) AXI Bus.

Figure 2:
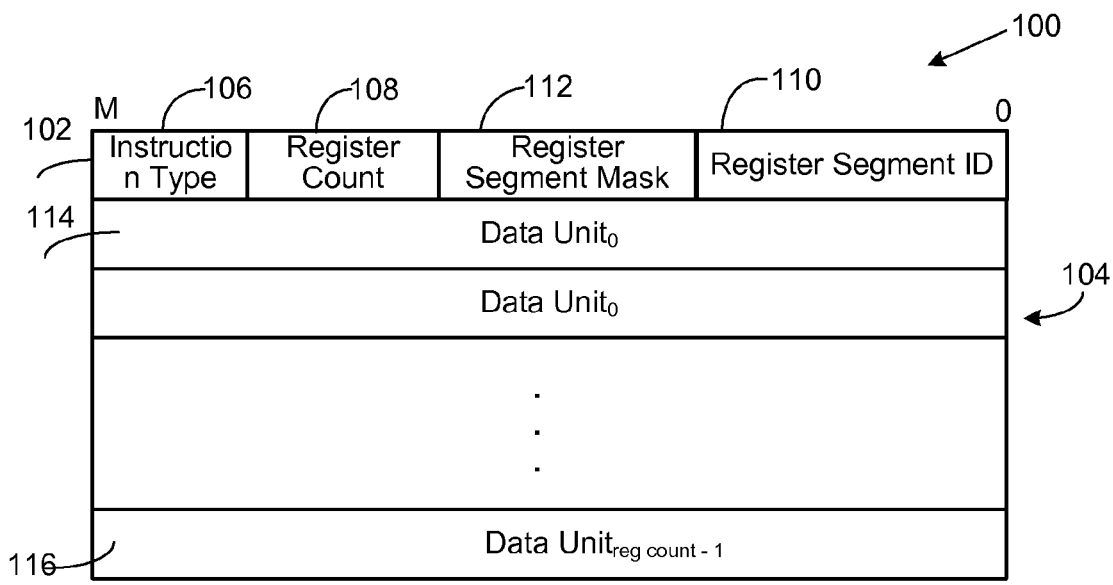
FIG. 2 illustrates an exemplary format of a segment/mask instruction used by the computer system of FIG. 1.

FIG. 2 illustrates an exemplary format of a segment/mask instruction 100 used by the computer system 10 of FIG. 1. During operation of the system 10, the instruction 100 is sent by the driver 22 as a data packet over the system bus 18 to an address indicating the command engine 24 of the co-processor 12.

The instruction 100 includes an instruction word 102 and a data block 104 comprising a plurality of data units 114-116. The instruction word 102 has bit fields defining, respectively, an instruction type 106, a register count 108, a register segment ID 110 and a register segment mask 112. Each of the bit fields includes a predefined number of bits sufficient to support the numbers of instructions, register segments, and registers per segment for the computer system 10. The instruction 100 has a predefined bit-width of M bits, where M is an integer. The bit-width M is preferably the same as the width of the internal bus 28, which is 64 bits.

The instruction type 106 is essentially an opcode that tells the command engine 24 what the instruction is. In this case, the instruction type is a predefined bit code indicating that the instruction is a segment/mask write instruction. The instruction type can alternatively indicate that the instruction is a segment/mask read instruction or some other instruction using the segment/mask addressing mode.

Only registers needing to be updated are loaded by the segment/mask write instruction. The number of registers to be updated is indicated by the register count 108. The register count 108 also indicates the number of data units included in the instruction 100.

The register segment mask 112 indicates which registers are to be updated by the instruction. The register segment mask 112 includes a plurality of mask bits, each corresponding to an individual register in a segment. The mask LSB points to the first register of the register segment specified by the register segment ID 110. Alternatively, the mask MBS can point to the first register of the register segment.

The data block 104 includes one or more data units 114-116. The data units can be data, configuration settings, instructions, constants or any other information that is usable by the co-processor 12. The data units 114-116 can be any suitable size, and are preferably the same size as the registers, which is preferably 64 bits.

The number of registers in a functional unit, and thus, the number of register segment mask bits can vary depending upon the requirements of each functional unit. The register segment mask 112 includes enough bits to cover the register segment with the greatest number of registers.

Figure 3:
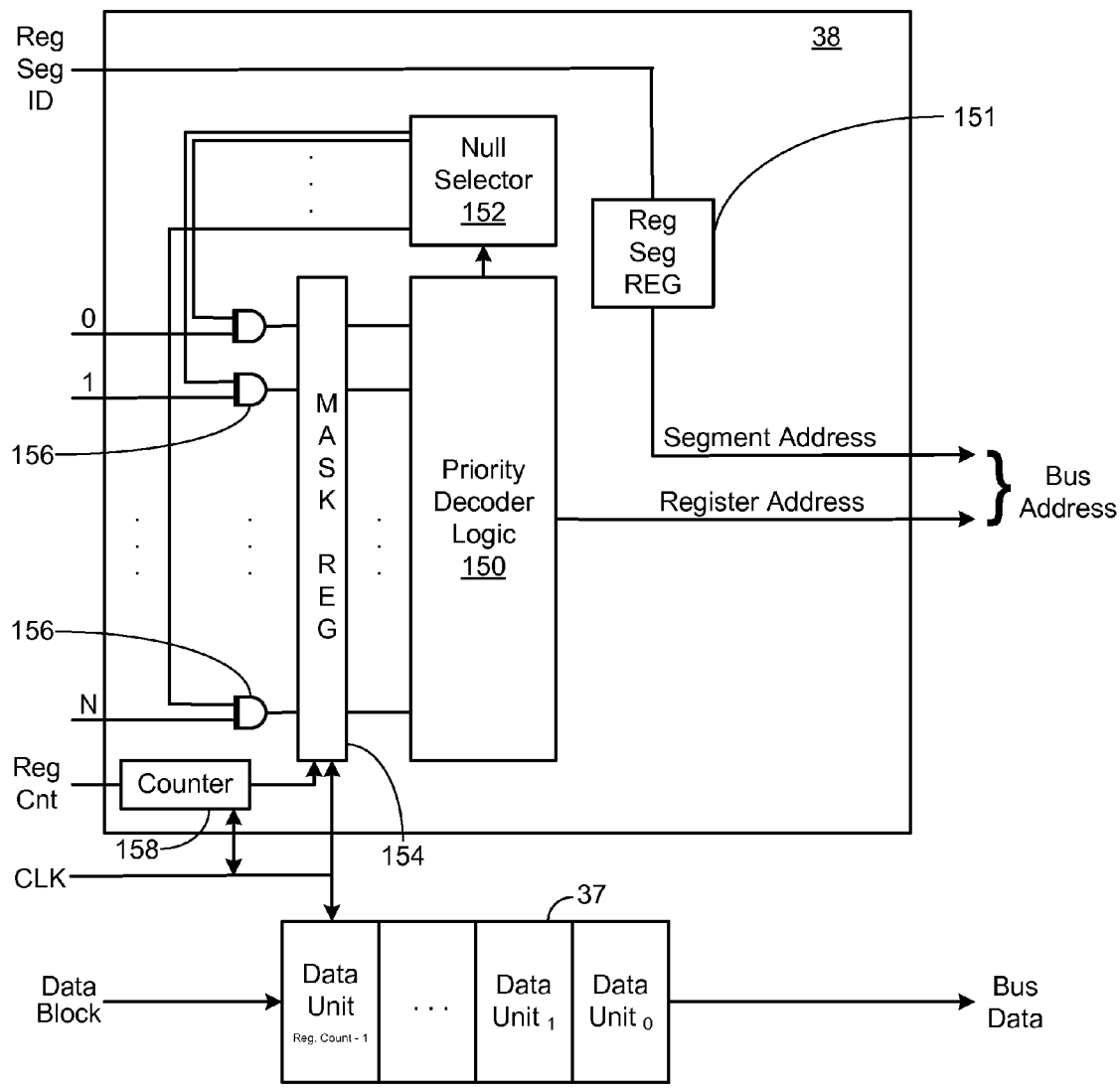
FIG. 3 is a block diagram illustrating details of the register addressing logic and FIFO of the co-processor shown in FIG. 1.

FIG. 3 is a block diagram illustrating details of the register addressing logic (RAL) 38 and FIFO 37 of the co-processor 12. The FIFO 37 stores the data block 104 with the data units 114-116 in order. The RAL 38 includes priority decoder logic 150, null selector 152, a mask register 154, and-gates 156 and counter 158. In response to receiving the register segment ID (reg seg ID), register segment mask 112, and register count (reg cnt) 108, the RAL 38 generates one or more bus addresses that are output on the address portion of the internal bus 28. Each bus address includes a segment address, which is the register segment ID, and a register address that is output from the priority logic decoder 150.

The segment address indicates a specific register segment 40 in one of the functional units 30-34. Within a recipient function unit, logic hardware receives the segment address and enables the register decoder 26 when there is a matching segment address.

The register address indicates a specific register in the addressed register segment. When the register decoder 26 within the recipient functional unit is indicated by the register segment ID 110, it decodes the register address on the internal bus 28, causing the data unit currently present on the internal bus 28, which is output from the FIFO 37, to be latched into the specific register being addressed within the selected register segment.

The RAL 38 and FIFO 37 operate together as follows. Initially, the register segment mask 112 is loaded into the mask register 154 and latched onto the inputs of the and-gates 156. The counter 158 is loaded with the register count 108 and the data block 104 is loaded into the FIFO 37. After the RAL 38 and FIFO 37 are initialized, the RAL 38 sequentially detects each set bit in the stored register segment mask, and together, the RAL 38 and FIFO 37 sequentially output bus addresses and corresponding data units onto the internal bus 28, one pair during each clock period, until all of the data units are loaded into the destination registers.

The priority decoder logic 150 and the null selector 152 cooperate together to read each of the set bits in the register segment mask stored in the mask register 154. Preferably, the stored register segment mask is read by the priority decoder logic 150 and null selector 152 from the LSB to the MSB; however, these devices can be alternatively configured to detect set mask bits from the MSB to LSB of the register segment mask.

The priority decoder logic 150 is combinational logic responsive to the output of the mask register 154. The priority decoder logic 150 detects a leading one bit in the register segment mask and generates a register address corresponding to the position of the leading one in the register segment mask. Preferably, the leading one bit is the least significant bit in the stored register segment mask that is set to one.

The null selector 152 is combinational logic that nulls previously read set mask bits by setting them to zero after they have been input to the priority decoder logic 150. The null selector 152 does this by decoding an output from the priority decoder logic 150 to output logical zeros to and-gate 156 inputs corresponding to register segment mask bits that have already been processed by the RAL 38. For set mask bits that have not been processed, the null selector 152 outputs logical ones to the corresponding and-gates 156 so that the corresponding latched mask bits persist in the mask register 154.

A clock signal (CLK) is applied to the FIFO 37, mask register 154 and counter 158. One set mask bit and corresponding data unit stored in the FIFO 37 are consumed per clock cycle and output to the register segments 40.

The counter 158 decrements the stored register count by one each clock cycle. The RAL 38 and FIFO 37 conclude processing of the register segment mask 112 and the data block 104 when the stored register count reaches zero.

Although FIG. 3 illustrates a write operation being performed by the RAL 38 and FIFO 37, one of ordinary skill in the art will recognize that the RAL 38 and FIFO 37 can be readily configured to read data from the register segments 40, or perform address decoding for other instructions incorporating the segment/mask addressing mode.

Figure 4:
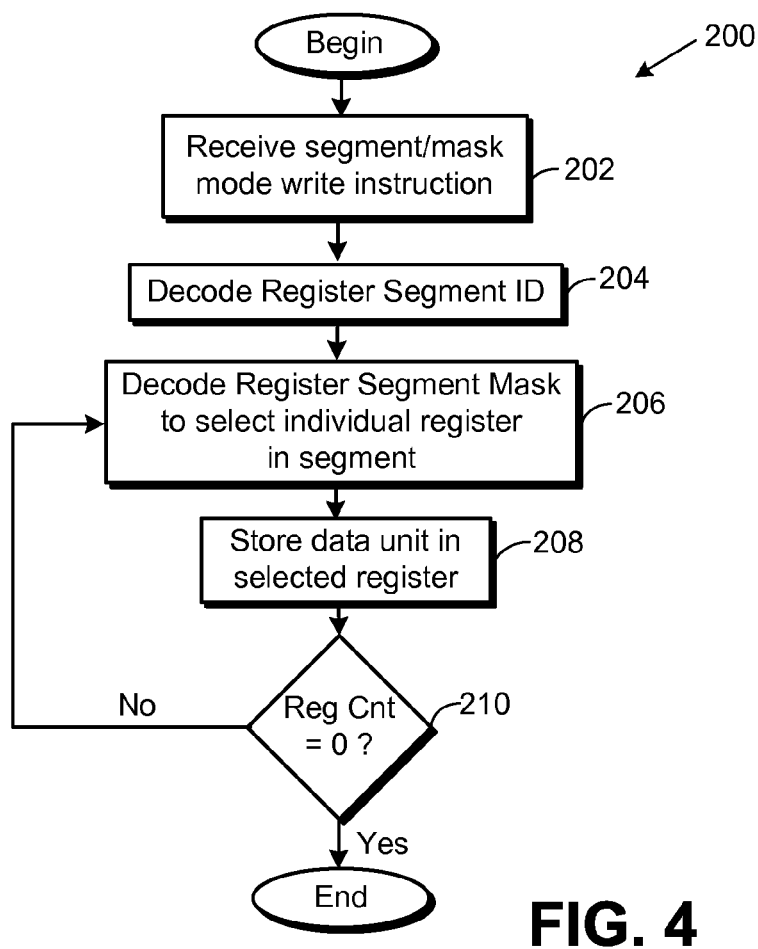
FIG. 4 is a flowchart illustrating exemplary co-processor operation in response to a segment/mask write instruction.

FIG. 4 is a flowchart 200 illustrating the operation of the co-processor 12 in response to a segment/mask write instruction. In step 202, the command engine 24 of the co-processor 12 receives the segment/mask instruction 100 issued by the driver 22. The instruction 100 includes the instruction word 102 and data block 104. The command engine 24 identifies the instruction as being a segment/mask address mode instruction from the instruction type 106, and accordingly loads the register segment mask 112 and register count 108 into the RAL 38, and also begins loading the FIFO 37 with the data block 104 as the data units 114-116 arrive over the system bus 18.

In step 204, the functional units 30-34 decode the register segment ID, which is sent over the internal bus 28 as the segment address, to select the destination register segment. This step selects the register decoder 26 within the recipient functional unit.

In step 206, the RAL 38 decodes the register segment mask 112, as discussed above in connection with FIG. 3, to generate the bus address, which selects individual registers within the identified register segment. The bus address is broadcast over the internal bus 28 and decoded by the register decoder 26 in the recipient functional unit so that the data unit output by the FIFO 37 can be stored in the register indicated by the register address (step 208).

The consecutively-ordered data units 114-116 of the data block 104 are transferred into registers indexed by the register segment mask 112 from the least significant mask bit to the most significant mask bit. That is, the first data unit, Data Unit$_0$, is stored in first register indicated by the lowest bit set in the register segments mask; the second data unit, Data Unit$_1$, is stored in the next lowest bit set in the mask, and so forth. Alternatively, the data block transfer can occur from the most significant bit to the least significant bit.

In step 210, the RAL 38 determines whether the register count has been decremented to zero. If so, the processing of the segment/mask write instruction terminates. If not, the method returns to step 206 and the next register segment mask bit and data unit are processed.

Figure 5:
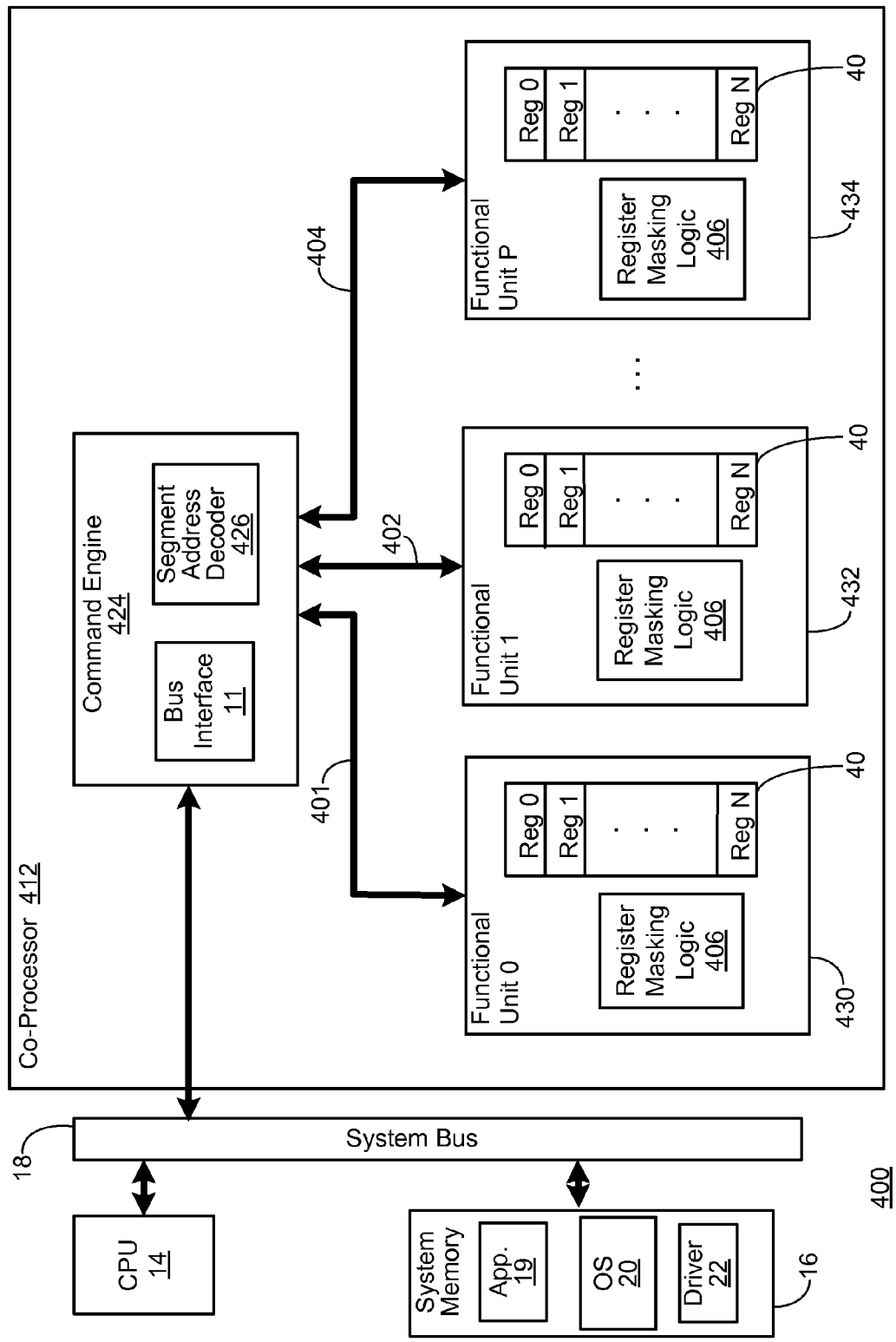
FIG. 5 is a block diagram of a computer system in accordance with an alternative exemplary embodiment of the present invention.

FIG. 5 is a block diagram of a computer system 400 in accordance with an alternative exemplary embodiment of the present invention. The computer system 400 performs many of the same functions of the first computer system 10, and it can be implemented using the same computing technologies as described above for the first computer system 10. However, the computer system 400 includes a co-processor 412 that has an alternative architecture that provides another two-level address decoding scheme that is distributed between a command engine 424 and functional units 430-434. The distributed two-level decoding scheme reduces the complexity of register address decoding and reduces the processing load of the command engine 424.

In this embodiment, the command engine 424 includes a segment decoder 426, and each functional unit includes register masking logic 406. Instead of a common internal bus 28, dedicated buses 401-404 connect the functional units 430-434 and the command engine 424. The command engine 424 decodes incoming instructions, such as instruction 100 shown in FIG. 2, and passes configuration data to the different functional units 430-434 for storage in the internal register segments 40 over the dedicated buses 401-404.

The command engine 424 performs the first-level decoding and the functional units 430-434 perform the second-level decoding. In the first level of decoding, the command engine 424 decodes the register segment ID 110 using the segment decoder 426. The register segment ID 110 indicates which one of the functional units 430-434 is to receive the data units 114-116 contained in the data block 104 associated with the instruction 100. Upon decoding the register segment ID 110, the command engine 424 routes the data block 102, register count 108 and register segment mask 112 to the recipient functional unit containing the selected register segment. The output of the segment decoder 426 is used to enable the dedicated bus corresponding to the identified functional unit.

In the second level of decoding, the recipient functional unit interprets the register segment mask 112 to determine which of its registers are to receive the individual data units 114-116 contained in the data block 102. This interpretation is performed by the register masking logic 406. Essentially, the register masking logic 406 includes the RAL 38 and FIFO 37 as shown in FIG. 3. However, the RAL used in the register masking logic 406 is configured differently. Unlike RAL 38, the RAL in the register masking logic 406 does not receive the register segment ID or output the segment address. In addition, the priority decoder in the register masking logic 406 does not output a register address. Instead, it outputs individual register enable signals corresponding to each register in the register segment 40. In other respects, the register masking logic 406 functions similarly to the functions of the RAL 38 and FIFO 37 as described above in connection with FIG. 3.

In the co-processor 412, the register segment mask 112 greatly simplifies the second-level decoding because the register masking logic 406 can use the mask to directly select the addressed registers, instead of using address comparison, which is typically used in global addressing schemes. The register segment mask also permits linear addressing time for the local registers and simplifies address decoding logic.

Register segmenting reduces the burden of first-level decoding on command engine 424 because the register segment ID 110 generally uses fewer addressing bits when compared to conventional global address schemes. In addition, the command engine 424 is only concerned with the register segment ID 110 and does not need to consider either the data block 102 or register segment mask 112. This simplifies the decoding logic of the command engine 424.

In an alternative architecture, the co-processor 412 includes a common internal bus, such as internal bus 28, between the command engine 424 and the functional units 430-434, instead of the dedicated buses 401-404. The command engine 424 is configured to broadcast the instruction word 102 over the common internal bus to the functional units 430-434 followed by data units 114-116. The common internal bus includes a signal bit that is set only when the instruction word 102 is broadcast on the bus by the command engine 424. In bus cycles when the signal bit is set, the functional units 430-434 decode the register segment ID 110 currently on the common internal bus to determine which functional unit is to receive the data units contained in the instruction 100. Each functional unit 430-434 includes a segment address decoder 426 for this purpose. If the signal bit is not set, the functional units do not attempt to decode incoming data units 114-116 presently on the common internal bus.

If the register segment 40 in a functional unit 430-434 is to receive the data units 114-116, as indicated by the register segment ID 110, the recipient functional unit latches the register segment mask 112 internally. The recipient functional unit then uses the register masking logic 406 to apply the register segment mask 112 to select individual registers in the register segment 40 to receive the incoming data units 114-116 that are subsequently received from the command engine 424 over the common internal bus.

Figure 6:
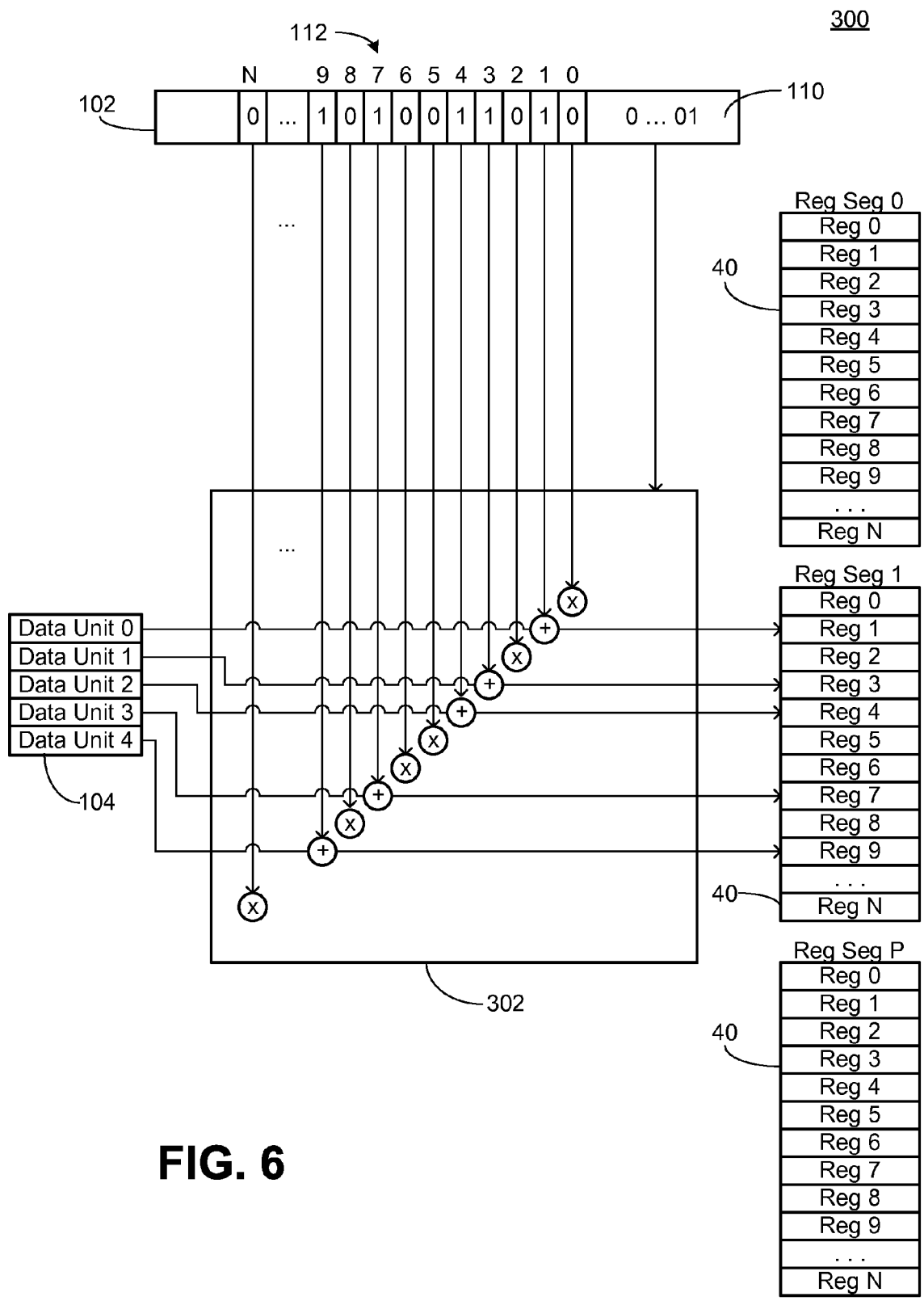
FIG. 6 is a conceptual dataflow diagram illustrating execution of a segment/mask write instruction within the co-processors of FIGS. 1 and 5.

FIG. 6 is a conceptual dataflow diagram 300 illustrating the execution of an exemplary segment/mask write instruction within the co-processor 12 of FIG. 1 and co-processor 412 of FIG. 5. In this example, Registers 1, 3, 4, 7 and 9 of Register Segment 1 are to be updated. The register segment ID 110 in the instruction word 102 is set to '0 . . . 01' so that Register Segment 1 (Reg Seg 1) is identified to be updated with five data units (Data 0-Data 4) contained in data block 104. Also, the mask bits corresponding to registers 1, 3, 4, 7 and 9 are set to '1' in the register segment mask 112 of the instruction word 102. This yields a value of '0 . . . 01010011010' for the register segment mask 112 in the instruction word 102, which indicates to the logic hardware 302 that the registers 1, 3, 4, 7 and 9 in the Reg Seg 1 are to be updated.

The data block 104 contains the five data units, Data 0-Data 4, in order. The logic hardware 302 takes as input the register segment mask 112, value '0 . . . 01010011010', and the register segment ID 110, value '0 . . . 01'. In response to these inputs, the logic hardware 302 loads Data 0 into register 1 of Reg Seg 1, Data 1 into register 3 of Reg Seg 1, Data 2 into register 4 of Reg Seg 1, Data 3 into register 7 of Reg Seg 1 and Data 4 into register 9 of Reg Seg 1.

The logic hardware 302 is digital circuitry that includes any suitable combination and number of logic gates and/or logic devices required to perform the functionality as described herein for the disclosed embodiments. The logic hardware 302 can include the register decoder 26, FIFO 37, RAL 38, or alternatively, the segment decoder 426 and register masking logic 406, as well as other logic hardware or any suitable combination of the foregoing.

Although the foregoing detailed description illustrates the segment/mask mode addressing scheme in the context of co-processors 12 and 412, it will readily occur to one of ordinary skill in art that segment/mask mode addressing can be employed in any suitable computing architecture, including stand-alone CPUs, networked computers, multi-processor systems or the like. In addition, the segment/mask mode addressing scheme can also be implemented in software code. A computer program stored on a computer-readable medium may include a first code segment for receiving an instruction comprising a memory segment identifier and a memory segment mask a second code segment for selecting a memory segment based on the memory segment identifier; and a third code segment for selecting one or more of memory locations in the memory segment based on the memory segment mask. The computer program may include additional code segments for performing the other functions described herein. The program code may be any suitable programming language or code, including firmware or microcode, and the computer-readable medium may be any suitable computer memory for storing the program code.

Other embodiments and modifications of this invention will occur readily to those of ordinary skill in the art in view of these teachings. The above summary and description is illustrative and not restrictive. The invention is to be limited only by the following claims, which include all such embodiments and modifications when viewed in conjunction with the above specification and accompanying drawings. The scope of the invention should, therefore, not be limited to the above summary and description, but should instead be determined by the appended claims along with their full scope of equivalents.

What is claimed is:

1. A processor, comprising:
   an interface for receiving an instruction comprising a memory segment identifier corresponding to a memory segment and further comprising a memory segment mask, wherein the memory segment mask comprises a plurality of mask bits corresponding to a plurality of memory locations in the memory segment, and wherein each mask bit indicates if a corresponding memory location is to receive a data unit;
   a first digital circuit configured to select the memory segment based on the memory segment identifier; and
   a second digital circuit configured to select one or more memory locations from the memory locations in the memory segment based on the mask bits of the memory segment mask;
   a third digital circuit configured to determine, based at least in part on the instruction, a register count, wherein the register count indicates a number of data units to be loaded into the selected one or more memory locations;
   a fourth digital circuit configured to load the data units into the selected one or more memory locations.

2. The processor of claim 1, wherein the memory segment mask identifies non-consecutive memory locations in the memory segment.

3. The processor of claim 1, further comprising a memory including a plurality of the memory segments, each of the memory segments including a predetermined plurality of memory locations.

4. The processor of claim 1, wherein the processor is a graphics processing unit.

5. The processor of claim 1, further comprising:
   a command engine including the interface;
   a functional unit including the memory segment; and
   a bus coupling the command engine and the functional unit;
   wherein the first digital circuit is included in the command engine and the second digital circuit is included in the functional unit.

6. The processor of claim 1, wherein the memory locations correspond to registers included in the processor.

7. A processor, comprising:
a plurality of register segments, each of the register segments including a predetermined plurality of registers;
an interface for receiving an instruction comprising a register segment identifier, a register segment mask having a plurality of mask bits corresponding to the registers of a register segment, and a data block comprising one or more data units, wherein each mask bit indicates if a corresponding register is to receive a data unit;
means for decoding the register segment identifier to select one of the register segments;
means for determining, based at least in part on the instruction, a register count, wherein the register count indicates a number of data units to be loaded into the registers of the register segment;
a priority decoder configured to determine which of the mask bits are set and to select the registers in the selected one of the register segments corresponding to the set mask bits; and
a FIFO memory configured to transfer the data units to the selected registers.

8. The processor of claim 7, wherein the set mask bits identify non-consecutive registers in the register segment.

9. The processor of claim 7, further comprising a command engine including the priority decoder and the FIFO memory.

10. The processor of claim 7, further comprising:
a command engine;
a functional unit including at least one of the register segments; and
a bus coupling the command engine and the functional unit.

11. The processor of claim 7, further comprising:
a plurality of functional units, each comprising one of the register segments.

12. The processor of claims 11, wherein the registers are configuration registers for the functional units.

13. The processor of claim 7, wherein the processor is a graphics processing unit.

14. A method of accessing a memory having a plurality of memory segments, each of the memory segments including a predetermined plurality of memory locations, the method comprising:
receiving an instruction comprising a memory segment identifier corresponding to a memory segment and further comprising a memory segment mask, wherein the memory segment mask comprises a plurality of mask bits corresponding to a plurality of memory locations in the memory segment, and wherein each mask bit indicates if a corresponding memory location is to receive a data unit ;
decoding the memory segment identifier to select the memory segment;
selecting one or more memory locations from the memory locations in the memory segment based on the mask bits of the memory segment mask; and
determining, based at least in part on the instruction, a register count, wherein the register count indicates a number of data units in the instruction to be loaded into the one or more memory locations;
accessing the selected memory locations.

15. The method of claim 14, wherein the memory segment mask indicates non-consecutive memory locations in the memory segment.

16. The method of claim 14, further comprising:
storing the data units in the selected memory locations.

17. The method of claim 14, wherein the memory locations correspond to configuration registers included in a graphics processing unit.

18. The method of claim 14, wherein the memory segment mask includes a plurality of mask bits, and the step of selecting includes:
determining which of the mask bits are set; and
selecting the memory locations corresponding to the set mask bits.

19. The method of claim 14, wherein the step of decoding is performed by a command engine included in a graphics processing unit and the step of selecting is performed by a functional unit included in the graphics processing unit.

20. A processor, comprising:
first means for receiving an instruction comprising a memory segment identifier corresponding to a memory segment and further comprising a memory segment mask, wherein the memory segment mask comprises a plurality of mask bits corresponding to a plurality of memory locations in the memory segment, and wherein each mask bit indicates if a corresponding memory location is to receive a data unit;
second means for selecting the memory segment based on the memory segment identifier; and
third means for selecting one or more memory locations from the memory locations in the memory segment based on the mask bits of the memory segment mask;
fourth means for determining, based at least in part on the instruction, a register count, wherein the register count indicates a number of data units to be loaded into the selected one or more memory locations;
fifth means for loading the data units into the selected one or more memory locations.

21. The processor of claim 20, wherein the memory segment mask identifies non-consecutive memory locations in the memory segment.

22. The processor of claim 20, further comprising a memory including a plurality of the memory segments, each of the memory segments including a predetermined plurality of memory locations.

23. The processor of claim 20, wherein the processor is a graphics processing unit.

24. The processor of claim 20, further comprising:
a command engine including the first means;
a functional unit including the memory segment; and
a bus coupling the command engine and the functional unit;
wherein the second means is included in the command engine and the third means is included in the functional unit.

25. The processor of claim 20, wherein the memory locations correspond to registers included in the processor.

26. A computer program tangibly stored on a computer-readable storage medium, comprising:
a first program code segment for receiving an instruction comprising a memory segment identifier corresponding to a memory segment and further comprising a memory segment mask, wherein the memory segment mask comprises a plurality of mask bits corresponding to a plurality of memory locations in the memory segment, and wherein each mask bit indicates if a corresponding memory location is to receive a data unit;
a second program code segment for selecting the memory segment based on the memory segment identifier; and a third program code segment for selecting one or more memory locations from the memory locations in the memory segment based on the mask bits of the memory segment mask;

a fourth program code for determining, based at least in part on the instruction, a register count, wherein the register count indicates a number of data units in the instruction to be loaded into the selected one or more memory locations;

a fifth program code for loading the data units into the selected one or more memory locations.

27. The computer program of claim 26, wherein the memory segment mask identifies non-consecutive memory locations in the memory segment.

28. The computer program of claim 26, wherein the memory locations correspond to registers included in the processor.

* * * * *